F. HÄCKER.
AGRICULTURAL RAKE.
APPLICATION FILED FEB. 18, 1922.

1,419,255.

Patented June 13, 1922.
2 SHEETS—SHEET 1.

Witnesses:

Inventor:
Fritz Häcker
By Chatwin Company
Attys

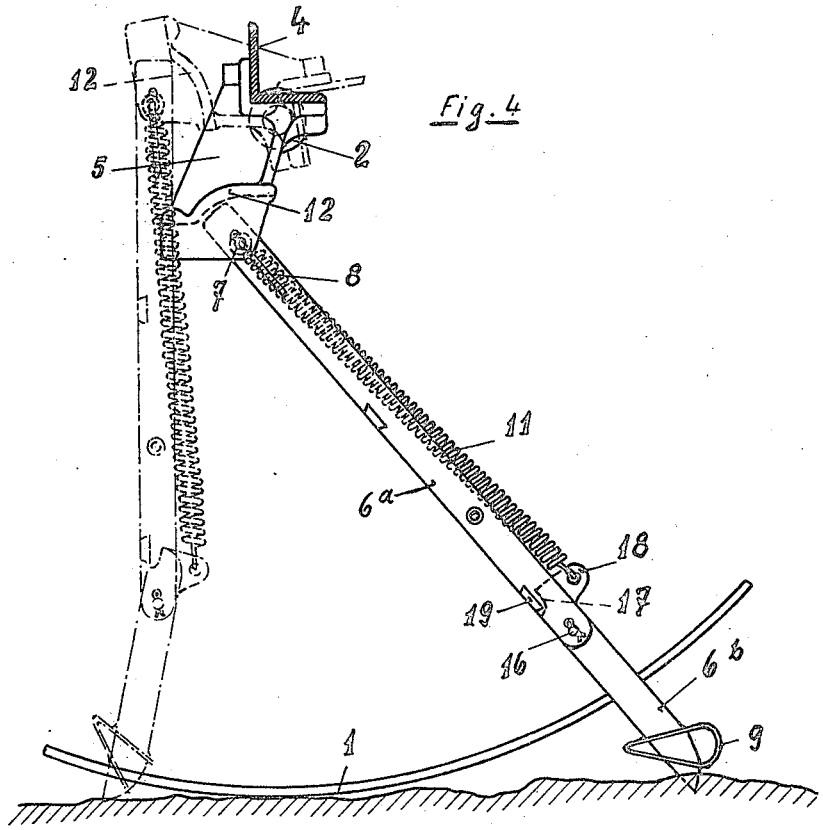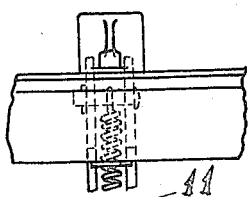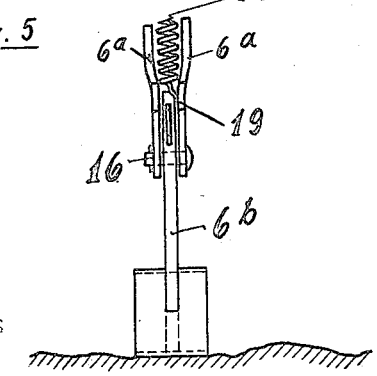

UNITED STATES PATENT OFFICE.

FRITZ HÄCKER, OF SPANDAU, GERMANY, ASSIGNOR TO DEUTSCHE WERKE AKTIEN-GESELLSCHAFT, OF BERLIN, GERMANY, A CORPORATION OF GERMANY.

AGRICULTURAL RAKE.

1,419,255.        Specification of Letters Patent.      Patented June 13, 1922.

Application filed February 18, 1922. Serial No. 537,535.

*To all whom it may concern:*

Be it known that I, FRITZ HÄCKER, a citizen of the German Republic, residing at Spandau, Germany, have invented new and useful Improvements in Agricultural Rakes, of which the following is a specification.

The invention relates to large agricultural rakes drawn by animals and carrying a basket to receive the rakings which can be emptied by a strut acting against the bottom of said basket, said strut being normally retained by spring power in an inoperative position. With ordinary implements of this kind it requires a strong adult person to effect the discharge of the basket.

It is the object of the present invention to provide an improved construction and arrangement which will enable a comparatively weak unskilled person to use the rake with safety.

The invention consists, in the arrangement of a discharging strut pivotally and slidingly mounted on a pin provided on the support of the basket and which strut is adapted to engage in a cup connected with the basket and to escape from said cup at the moment of discharge of the basket, after which the fall of the returning empty basket forces the strut back into inoperative position.

In a modification the strut has a jointed articulated yielding member which is fitted with a spur or toe, said member being so connected with the spring for pulling the strut upwards whilst discharging the basket, as to automatically yield and accommodate itself to obstructions in or on the ground.

Figure 1:
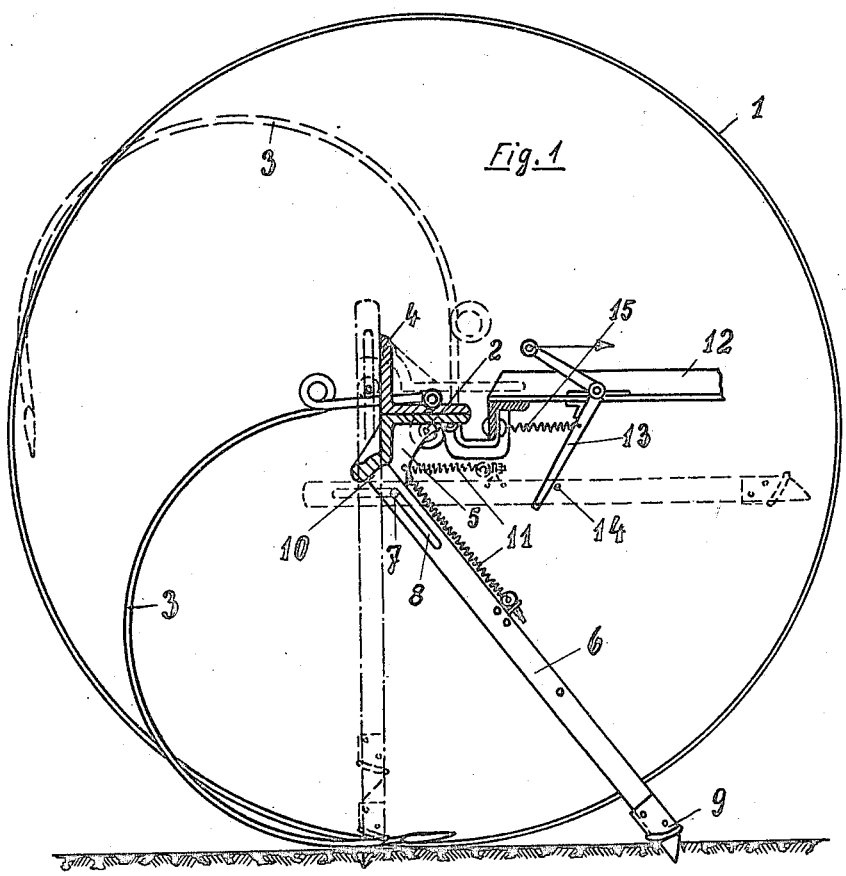
Figure 2:
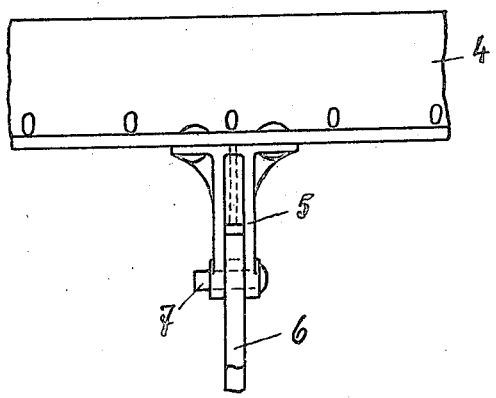
Figure 3:
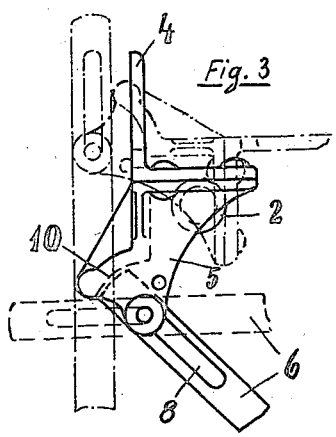

The accompanying drawings show two embodiments of the invention by way of example; in these drawings, Figure 1 is a sectional side elevation showing the strut of the basket in three different positions; Figs. 2 and 3 are a front view and side view showing the connection with and position of the strut on the basket; Figs. 4 and 5 are a side view and a front view respectively of the arrangement in connection with a jointed strut.

These drawings show only the rear portion of a hay-rake comprising two large wheels 1 united by an axle-tree 2 carrying the basket which consists in the tines 3 and the tine-carrier 4 in which the hay collects during the working periods. To an arm 5, at the underside of the carrier 4, is swingingly secured a strut 6 on the pivot 7 on which the strut can also slide endwise by reason of its guide slot 8. The free end of the strut is fitted with a spur or toe 9 which at the lowering of the strut for tipping the basket 3, 4, digs into the ground at an inclination of about 45° ahead of the axle-tree 2, while the other end of the strut 6 engages in a cup 10 of the arm 5 and thus produces pressure against the basket 3, 4. The pivot 7 of the strut and the cup 10 of same are below and behind the axis 2 of the tine-carrier 4, so that the arm 5 forms lever arm and the cup 10 at the end receives pressure from the strut 6 till the latter reaches an upright position (shown by dots and dashes) when it is off the cup 10 to rearward, as is shown clearly by dots and dashes in Fig. 3. The lower lip of the arm 5 serves to guide the strut 6 to its retracted position. At that moment the strut 6 is pulled upward in endwise direction by a previously tensioned spring 11 and is temporarily retained. The basket 3, 4, by reason of its heaviest part being to the rear of the axis 2, falls back into normal position and at the same time the rear edge of the cup 10 forces the strut 6 into a horizontal position shown by broken lines in Figs. 1 and 3.

To render the strut 6 operative, a cranked foot-lever 13 pivotally mounted on the frame 12 of the rake and acting against a peg 14 on the strut 6 moves the latter lengthwise by reason of its slot 8 while at the same time tensioning the spring 11 till the end of the strut enters the cup 10. The strut then falls by its own weight downwards and picks into the ground and finally lifts the basket during the travel of the rake.

In order that automatic action of the basket under any circumstances and more particularly to preserve freedom of play for the strut 6 over uneven ground or in encountering other obstructions such as large stones, the strut is provided with a knee-joint formed of the parts 6ª and 6ᵇ as shown in Figs. 4 and 5. The parts 6ª and 6ᵇ are connected together by a pivot 16. The lower part 6ᵇ extends upward beyond the pivot 16 and has a notch 17 and a laterally projecting lug 18. Adjacent the lower end of said part 6ᵇ is an angular forwardly extending lug 9, as shown in Figure 4. The notch 17 comes to rest against a stop 19 which holds together the two bars forming the upper part $6^a$, see Fig. 5. The lug 18 holds the end of the spring 11 which is suitably tensioned. By reason of the position of the lug 18 above and sidewise of the pivot 16 of the part $6^b$ the spring 11 acts upon a lever $6^b$, 18 and tends to keep the two members of the strut in alignment till the strut reaches a vertical position (see dots and dashes) and escapes from the cup 10, after which the spring 11 pull the strut upwards. Immediately afterwards the basket 3, 4 falls back and strikes against the part $6^a$ and if the part $6^b$ then meets an obstruction it will yield by bending at the knee-joint and afterwards stretching again under the pull of the spring 11.

I claim:

1. In a horse-rake, automatic mechanism for emptying the rake-basket, which consists in a strut having a slot in turnable and slidable engagement with its pivot, a wheel-axle, a basket swingingly mounted on the axle, an arm pivoted beneath the basket carrying the pivot for said strut, a cup connected with the arm for temporary engagement with the pivotal end of the strut, and a spring secured to the strut and the said arm respectively, as and for the purpose described.

2. In a horse rake, a wheel axle, a basket pivoted on same, a depending cupped arm on the basket, a pivotal and slidable strut secured to and in temporary engagement with the cup of said arm, a spring fast to the arm and the strut respectively, ordinary frame-work completing the rake forward of the basket, and a foot lever pivoted on the frame and producing a forward movement of strut, as and for the purpose described.

3. In a horse rake a tilting basket, a depending cupped arm connected with same, a slotted swinging and slidable strut carried by the arm, means for carrying the strut in horizontal position, means for pushing the strut forwardly and allowing same to engage in the ground, means for guiding the strut to an upright position behind the basket, means for pulling the strut out of the ground and close against the rear of the basket, means connected with the arm of the basket for starting the strut back to its initial horizontal position.

4. In a horse rake, a tilting basket, a swinging strut turnably and slidably connected with the basket, a pivoted lower part carried by the strut, an angular forward lug on said lower part, a spring for pulling the said part into alignment with the strut, and a stop on the strut to hold said lower part in proper alignment against the pull of the spring, as described.

5. In a horse rake a swinging turnably and slidably suspended strut comprising a slotted upper part formed of two bars, a lower part pivoted between the lower portion of said bars, an extension to the lower part above its pivot, a lateral lug at the end of the extension, a spring attached to the lug and to the pivot of the upper part, a notched rear portion on said extension, and a stop on the upper part in normal engagement with said notched extension, as and for the purpose described.

FRITZ HÄCKER.